(12) United States Patent
Heinrich et al.

(10) Patent No.: US 6,919,793 B2
(45) Date of Patent: *Jul. 19, 2005

(54) RADIO FREQUENCY IDENTIFICATION SYSTEM WRITE BROADCAST CAPABILITY

(75) Inventors: Harley Kent Heinrich, Everett, WA (US); Christian Lenz Cesar, Shrub Oak, NY (US); Thomas A. Cofino, Rye, NY (US); Daniel J. Friedman, Sleepy Hollow, NY (US); Kenneth Alan Goldman, Norwalk, CT (US); Sharon Louise Greene, Mt. Kisco, NY (US); Kevin P. McAuliffe, Cortlandt Manor, NY (US)

(73) Assignee: Intermec IP Corp., Everett, WA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/382,382

(22) Filed: Aug. 24, 1999

(65) Prior Publication Data

US 2002/0118097 A1 Aug. 29, 2002

Related U.S. Application Data

(63) Continuation of application No. 08/694,606, filed on Aug. 9, 1996, now Pat. No. 5,942,987, which is a continuation-in-part of application No. 08/303,965, filed on Sep. 9, 1994, now Pat. No. 5,673,037.

(51) Int. Cl.[7] .............................................. H04Q 5/22
(52) U.S. Cl. ................................ 340/10.32; 340/572.3; 367/6; 455/140; 365/192; 342/51
(58) Field of Search ............................. 340/10.32, 10.4, 340/41, 10.51, 5.92, 10.2, 572.1, 572.3, 572.4, 10.31, 10.3; 342/42, 44, 51; 367/2, 6; 455/141; 365/192; 380/28

(56) References Cited

U.S. PATENT DOCUMENTS

| | | | | |
|---|---|---|---|---|
| 4,691,202 A | * | 9/1987 | Denne et al. | 340/10.2 |
| 5,008,661 A | | 4/1991 | Raj | |
| 5,245,346 A | | 9/1993 | Nishimura et al. | 342/42 |
| 5,252,979 A | | 10/1993 | Nysen | 342/50 |
| 5,280,435 A | | 1/1994 | Weisshaupt et al. | 364/514 |
| 5,294,931 A | | 3/1994 | Meier | |
| 5,302,954 A | | 4/1994 | Brooks et al. | 342/44 |
| 5,347,263 A | | 9/1994 | Carroll et al. | 340/572 |
| 5,355,137 A | | 10/1994 | Schurmann | 342/42 |
| 5,365,551 A | | 11/1994 | Snodgrass et al. | 375/1 |
| 5,374,930 A | | 12/1994 | Schuermann | |
| 5,410,315 A | | 4/1995 | Huber | |
| 5,434,572 A | | 7/1995 | Smith | 342/44 |
| 5,450,492 A | | 9/1995 | Hook et al. | |
| 5,550,547 A | * | 8/1996 | Chan et al. | 342/42 |
| 5,550,548 A | | 8/1996 | Schuermann | |
| 5,673,037 A | * | 9/1997 | Cesar et al. | 340/10.32 |

FOREIGN PATENT DOCUMENTS

| | | |
|---|---|---|
| EP | 0 285 419 A2 | 10/1988 |
| EP | 0 702 323 A2 | 3/1996 |
| EP | 0 702 324 A2 | 3/1996 |
| NL | 8 802 718 A | 6/1990 |

* cited by examiner

Primary Examiner—Michael Horabik
Assistant Examiner—William Bangachon

(57) ABSTRACT

A Write Broadcast system and method uses a base station to write sent data to all or some selected number (sub group) of tags in a base station field simultaneously. By unselecting the tags that have been successfully written to, and requesting a response from the remaining tags in the field (or sub group), the system determines, by receiving a response to the request, that there are tags in the field (sub group) that were unsuccessfully written to. Another Write Broadcast signal is sent to these tags. The system is useful for quickly (simultaneously) "stamping" information on the tag memory of a large number of tags in the field of the base station.

25 Claims, 10 Drawing Sheets

RADIO FREQUENCY IDENTIFICATION SYSTEM WRITE BROADCAST CAPABILITY

CROSS-REFERENCE TO RELATED APPLICATIONS

The present application is a continuation of application Ser. No. 08/694,606 filed Aug. 9, 1996, now U.S. Pat. No. 5,942,987 issued Aug. 24, 1999, which in turn is a continuation-in-part of application Ser. No. 08/303,965 filed Sep. 9, 1994, now U.S. Pat. No. 5,673,037 issued Sept. 30, 1997.

FIELD OF THE INVENTION

This invention relates to the field of radio frequency tagging. More specifically, the invention relates to a radio frequency tagging system that is capable of simultaneously writing information onto large groups of tags.

BACKGROUND OF THE INVENTION

A radio frequency (RF) identification system consists of an RF base station and one or more RF tags.

In a typical configuration, the base station (also referred to as a reader) has a computer section which issues commands to an RF transmitter and receives commands from an RF receiver. The commands serve to identify tags present in the RF field or range of the base station. In some implementations, base station commands exist to gather (read) tag information from the tags after the tags in the field are identified. In more advanced systems, once the tags in the field are identified, base station commands exist which output (write) information to the tags. This output information may be held temporarily on the tag, it may remain until over written, or it may remain permanently on the tag.

The RF transmitter of the base station encodes the command from the computer section. The encoded command is then modulated from a base band signal on the radio (carrier) frequency. The modulated carrier is amplified by the base station and passed to a base station RF antenna for transmission to one or more RF tags in the base station field. The tags transmit or reflect a return signal back to the base station, sometimes with tag information encoded on the return signal by the tags. The base station RF receiver gathers (reads) the return signal at the base station RF antenna, demodulates the return signal from the RF carrier frequency to the base band, decodes the base band signal, and passes the decoded base band signal (information) back to the computer section for processing. The base station antenna sends RF signals to and receives RF (return) signals from one or more tags within the RF signal range. The tags within the range of the RF carrier frequency are said to be in the field of the base station. See U.S. Pat. No. 4,656,463 to Anders et al. entitled LIMIS Systems, Devices and Methods, issued on Apr. 7, 1987 which is herein incorporated by reference in its entirety.

In these prior art systems, the base station must identify some or all of the tags in the field of the base station (reader) before any data can be written to any of the tags in the field. In one prior art system, tags are temporarily turned off (deactivated) once the tags are successfully identified by the reader. After a period of time, e.g. approximately 10 minutes, the deactivated tags can be reactivated. See EP 0 494 114 to Marsh et al. filed on Mar. 1, 1992 and entitled "Electronic Identification System" which is herein incorporated by reference in its entirety.

STATEMENT OF PROBLEMS WITH THE PRIOR ART

Many applications of radio frequency identification tags require writing information onto large groups of tags as they pass (within the field of) a radio frequency identification system reader (base station). In prior art radio frequency identification systems, the reader must identify the tags in the field before the reader can write to any of the identified tags in the field.

In applications where there are many tags in the field at the same time, many prior art techniques fail to identify all the tags in the field. In these cases, some prior art systems fail to write information to any of the tags in the field. In other prior art systems, the unidentified tags can not be written to.

Even if all tags in the field are identified, existing radio frequency identification systems can take too much time to write to all the tags in the field requiring written information. For example, if there are ten tags requiring written information in a field of 10,000 tags, all of the 10,000 tags have to be identified by some prior art systems before the information can be written to the ten tags. Identifying this many tags can be time consuming or impossible for most prior art systems. As another example, if there are 100 or more tags in the field, prior systems require a long period of time—seconds to minutes—to identify and write to the appropriate tags. For these systems, the tags must be stationary in the base station field or move very slowly through the base station field.

The prior art has the capability to read and write and read after write. However, as stated above, the prior art requires that the tags identify themselves to the base station before the base station can read/write/read to the tags. Many commercially available systems, e.g. available from Texas Instruments and Indala, must sequentially identify the tags in the field before writing to the tags. These systems are unable to identify and therefore unable to write to large numbers of tags moving through the field of the base station. Other commercially available systems, e.g. available from Hughes, Micron, and David Sarnoff Research center system, and even systems described in the literature, e.g. by CSIR and Single Chip Systems, can identify more than one item in the field at a time. However, these systems must identify all the tags in the field before they can write to them. Identifying all the tags in the field can be very time consuming. Further, where there are a very large number of tags in the field or the tags are passing quickly through the field, these systems fail to identify all of the tags and therefore fail to perform the write operation.

These and other prior art limitations make RF tags unsuitable for use in many applications.

For many applications where tags pass quickly through the base station field-such as identifying items on a high-speed manufacturing line—prior art radio frequency identification systems are either unable or too slow to write to tags in the field. The prior art requires that the manufacturing process change, e.g., a manufacturing line must slow down, in order to use RF tag technology.

Prior art systems also can not effectively write to very large numbers of tags in the base station field. For example, a transit application might have a large number of tagged items in a tagged container. To log the movement of a container and the contents within the container, the prior art must identify all the tags in the container as well as the container itself. Data might then be sequentially written to some or all of the identified tags. Some prior art will fail to identify, hence write to, all of the tags. Using other prior art techniques, the container might be required to pause in the field to allow enough time to identify and sequentially write to all of the tags in the field. This pause may cause an undesirable delay in the movement of the container.

In summary, many systems described in the prior art fail to effectively write to large numbers of tags in the field because some prior art can not identify the individual tags before sequentially writing to the tags. Even those systems that are capable of identifying and writing to large numbers of tags in the field are slow because the serial identification and writing processes takes an unacceptably long amount of time. Therefore these prior art systems are unacceptable for many applications.

OBJECTS OF THE INVENTION

An object of this invention is an improved system and method of writing information to all radio frequency tags in a base station field and/or sub groups of the tags in the base station field.

An object of this invention is an improved system and method of simultaneously writing information to groups and/or sub groups of large numbers of radio frequency tags in a base station field.

An object of this invention is an improved system and method for determining which tags in a field of radio frequency tags have been written to successfully and/or unsuccessfully.

SUMMARY OF THE INVENTION

The present system and method embodies a write broadcast protocol that permits a base station to write sent data to all or some selected number (sub group) of tags in the base station field simultaneously. By unselecting the tags that have been successfully written to, and requesting a response from the remaining tags in the field (or sub group), the system determines, by receiving a response to the request, that there are tags in the field (sub group) that were unsuccessfully written to.

One preferred embodiment of the system has a plurality of radio frequency tags, each tag having a tag logic, a tag antenna, and a tag data location. The base station has a signal generator, a transmitter, and a base antenna. The signal generator sends a carrier signal through the transmitter and base antenna to create a field. The signal generator generates sent data that the transmitter encodes on the carrier signal. All of the tags in the field simultaneously receive the carrier signal through their respective tag antennas. The tag logic of each tag in the field responds to the carrier signal by decoding the sent data from the carrier signal and storing the sent data in the respective tag data location. In this way, the sent data is simultaneously written to the tag data location of each tag in the field (sub group) in response to the one carrier signal. No tag identification is required prior to the simultaneous writing to more than one tag. The system is useful for "stamping" information on the tag memory. The carrier signal can be periodically send so that any number of tags (or sub groups) are simultaneous "stamped" when they pass into the field of the base station.

In an alternative preferred embodiment, the radio frequency tagging system includes a plurality of radio frequency tags, each tag having a tag logic and a tag antenna and each tag further having one or more tag data locations referred to through an associated tag data address. In this embodiment, the base station has a computer, a transmitter, and a base antenna. A process executed by the computer causes a radio frequency write broadcast signal, with an encoded sent data and a sent addresses corresponding to the sent data, to be sent through the transmitter and base antenna to create a field. The tags in the field receive the write broadcast signal through their tag antennas and the tag logic of each tag in the field causes the sent data to be stored in the tag data location that has a tag data address matching the sent address. Thus in response to a single write broadcast command signal, all the tags in the field write the sent data to their tag data location that corresponds to tag data address matching the sent address. By selecting a sub group of tags in the field, only the tags selected to be in the sub group can be made to respond to the write broadcast command signal.

BRIEF DESCRIPTION OF THE DRAWINGS

FIG. 6 shows two flow charts.

DETAILED DESCRIPTION OF THE INVENTION

Figure 1:
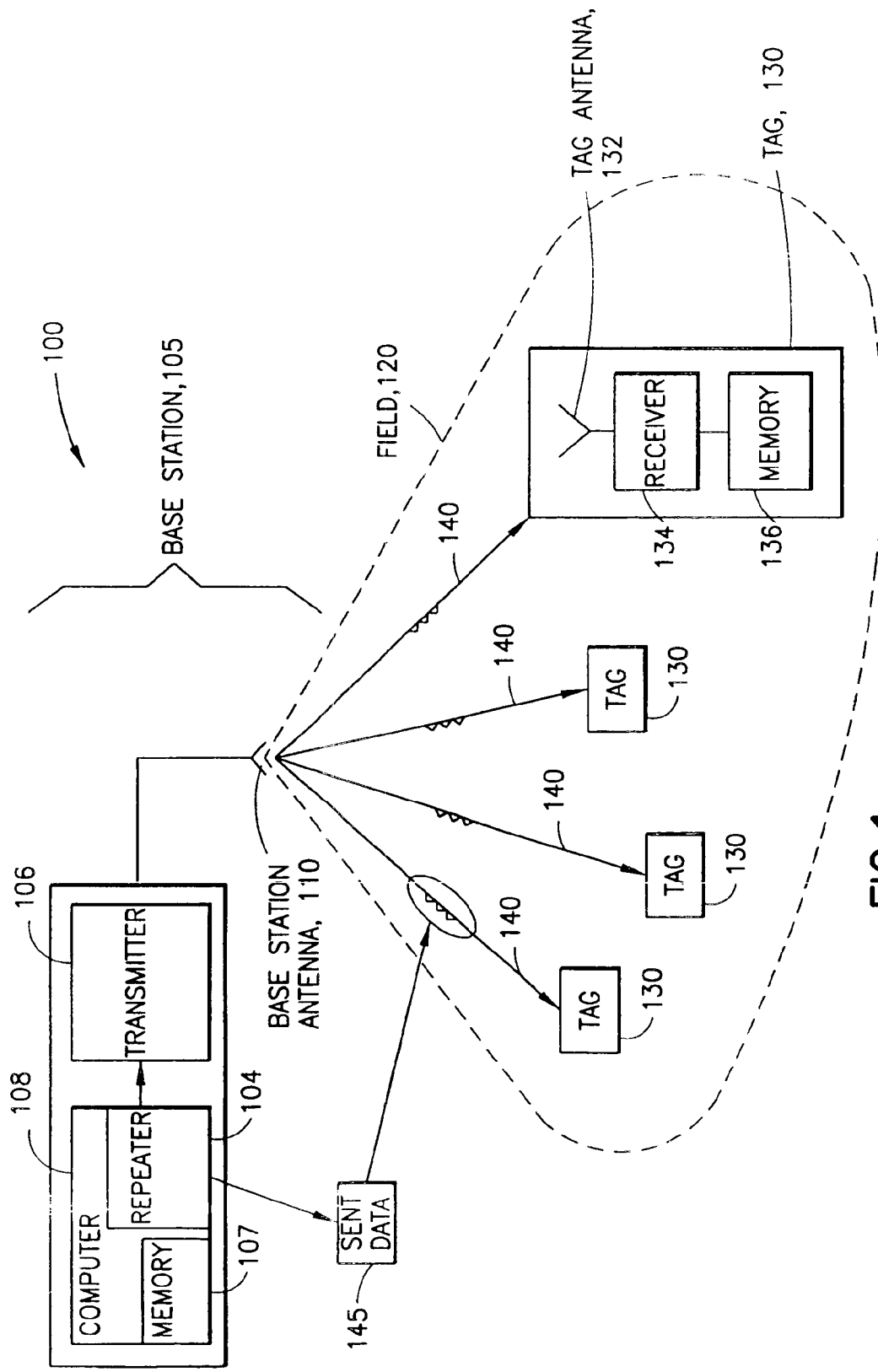
FIG. 1 is a block diagram showing one preferred embodiment of the present invention including a base station communicating with a large collection of radio frequency identification tags.

FIG. 1 is a block diagram of a radio frequency tagging system 100 that includes a radio frequency base station 105 with an optional computer 108, a transmitter or transponder 106, and a base antenna 110. A repeater 104 causes a radio frequency signal 140 to be broadcast to a field of tags 120 by using the transmitter 106 and base antenna 110. The repeater 104 is an apparatus that causes sent data 145 stored in a memory 107 to be broadcasted at predetermined times, e.g. every 2 minutes. In one preferred embodiment, the repeater 104 is a timer that inputs the sent data 145 stored in memory 107 to the transmitter 106 at the predetermined times. If a computer 108 is provided, the repeater 104 can be implemented as a process performed by the computer 108.

The field of the base station 120 includes the physical space in which the radio frequency signal 140 is propagated by the transmitter 106 and base station antenna 110. The radio frequency signal 140 carries the sent data 145. For example, the sent data 145 is impressed on the radio frequency signal 140 using well known modulation techniques.

One or more radio frequency tags 130 are typically located within-the field 120. The tags 130 have a tag memory 136, a tag radio frequency component 134, and a tag antenna 132. The tag radio frequency component 134 receives (and sends) signals 140 through the tag antenna 132. Examples of preferred RF tags 130 are given in U.S. Pat. No. 5,528,222 (application Ser. No. 08/303,977) to Moskowitz et al. filed on Sept. 9, 1994 and issued on Jun. 18, 1996, which is herein incorporated by reference in its entirety.

Note that while this disclosure specifically address tags using radio frequencies to communicate with the base station, the invention also applies generally to any communication system where a base unit communicates with one or more transponders, e.g., tags. The communication means is not limited to radio frequency but includes any media for communicating information, i.e., laser, infrared, visible light (photo optics), ultraviolet, magnetics, and/or other electromagnetic media. For each of these communications means, the transmitter 106 base station antenna 110, tag antenna 132, and tag receiver 134 are apparatus suitable for the respective means of communication. These apparatus are well known.

Figure 2:
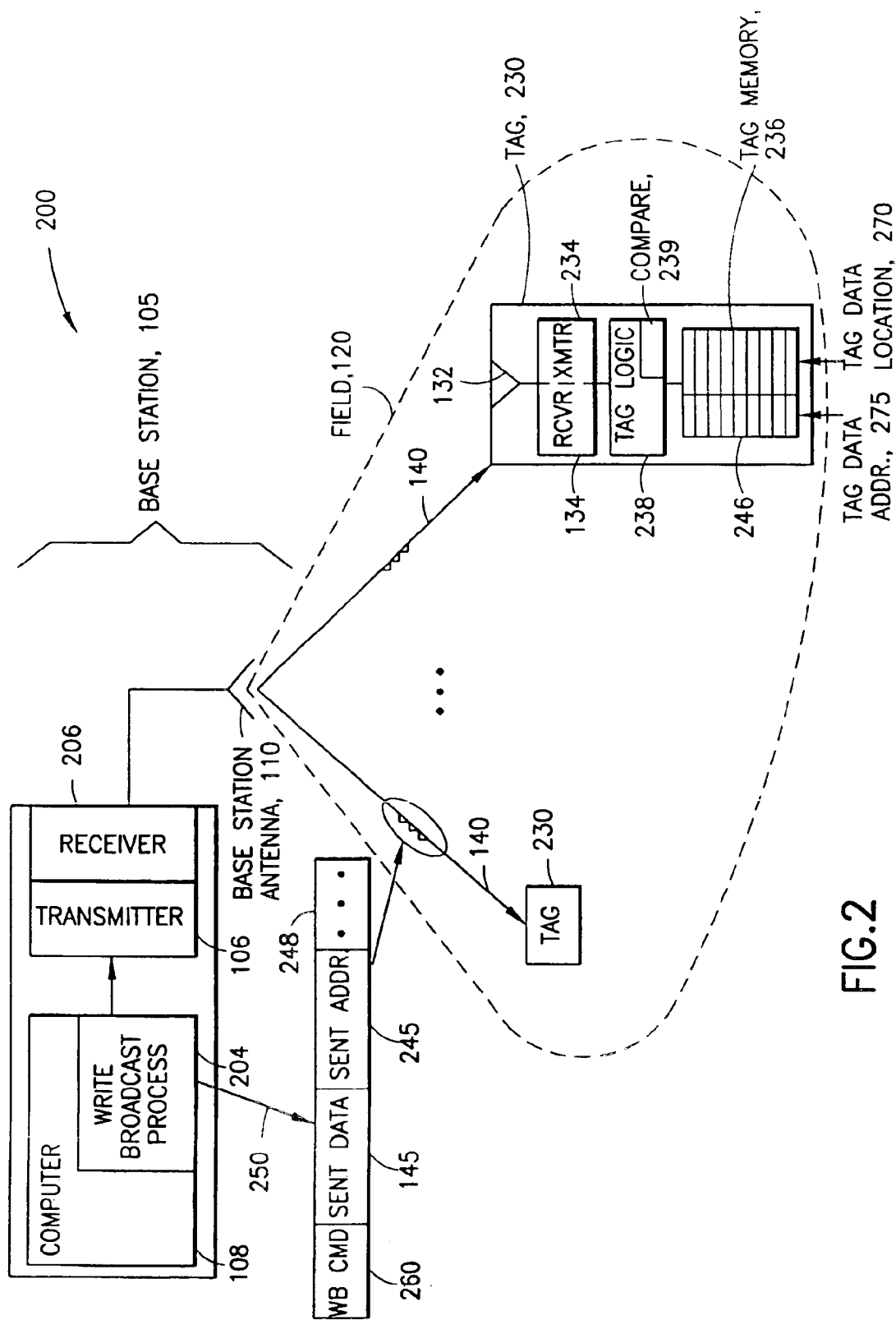
FIG. 2 is a block diagram showing an alternative preferred embodiment of the present invention including a base station communicating with a large collection of radio frequency identification tags and/or one or more sub groups of the collection of RF tags in a base station field.

An alternative preferred system 200 is shown in the block diagram in FIG. 2. In this embodiment, features that are common with those in system 100 have the same numbers. A computer 108 is used in system 200 and the repeating component 104 is replaced by a Write Broadcast process 204 executed by the computer 108. The base station 105 includes a transmitter 106 as before. Here an RF receiver 206 is optionally included. In this embodiment, the sent data 145 is included in a data package 250 that includes a sent address 245. A Write Broadcast command/instruction 260 is optionally included in the data package 250. The sent address 245 corresponds to the sent data 145. In alternative embodiments, pairs 248 of sent data 145 and a corresponding sent address 245 are included in the data package 250. Note that the sent data 145 could be comprised of a plurality of data units, e.g. a string or stream of bits or bytes, that are stored at a tag data location 270 starting or ending at a single sent address 245 corresponding to a related tag data address 275 in the tag memory 236. Alternatively, the sent address 145 could be absent, implying that the first or last data unit of the string is always stored in the tag data location 270 with a fixed tag data address 275 in the tag memory 236. Alternatively, a single sent data 145 could be stored at multiple tag data locations 270 each with a sent address 245 each corresponding to a tag memory address 275 in the tag memory 236. Alternatively, the sent data 145 could be absent, implying that a predetermined fixed string of data, e.g. a value of zero or nine, will be stored in the tag data location 270 with a tag data address or addresses 275 in the tag memory 236 that correspond to the sent address or addresses 245. Alternatively, the sent data 145 and the sent address 245 both could be absent, where the write command 260 causes all tag data locations 270 to have a predetermined value.

The tag 230 has a tag antenna 132 and a tag receiver that receives the signal 140 (carrying the data package 250) as in system 100. However, the tag 230 also includes a tag logic 238 and a tag memory 236 that has more than one tag data location 270. Each tag data location 270 has a tag data address 275 corresponding to the respective tag data location 270. In this preferred embodiment, the tag 230 receives signal 140 (data package 250) through the tag antenna 132 and tag receiver 134. The tag logic 238 optionally identifies the data package 250 as a write broadcast command (using command field 260) and places the sent data 145 of the data package 250 in the tag data location 270 corresponding to the tag data address 275 that is the same as the sent address 245 in the data package 250. If the data package 250 has more than one pair 248 of send data and sent addresses 245, the tag logic 238 places each of the sent data 145 in the tag data location 270 that corresponds to the tag data address 275 that is the same as the respective sent address 245 of the pair 248 in the data package 250. (See below for a further description of the tag logic 238.)

In frequent applications of the invention, it is necessary for the base station to write the same information (sent data 145) to all the tags physically located in the field 120 of the base station 105. The sent data 145 is written to all tags 230 (or a sub group of tags 230) in the field 120 simultaneously. Simultaneous writing means that two or more tags (130, 230) in the field 120 write sent data 145 to the tag memory 236 in response to a single Write Broadcast command. No other commands need to be sent for the sent data 145 to be written to all (or all in the subgroup) of the tags in the field. This can occur because no tags in the field need to be identified before this writing takes place.

In a typical application, such as identifying items at a receiving dock, many items, perhaps hundreds or even thousands, may be presented to the base station (reader) 105 by being in the field 120 at a given time. Examples of sent data 145 include date or time stamps that might indicate when a tag arrives or passes by a location, is purchased, etc. or location information that identifies a place where a tag is currently located or passing or is to be sent.

One novel feature of this invention is that the base station 105 can write information (sent data 145) to a plurality of tags 130 in the field 130 simultaneously without identifying each of the tags 130/230 in the field 140. This feature significantly reduces the time to communicate the information to the tags. This also enables "stamping" large numbers of tags in applications that were impossible to prior to this invention because of the time required by the prior art to communicate (and identify) all the tags in the base station field 140.

Figure 3:
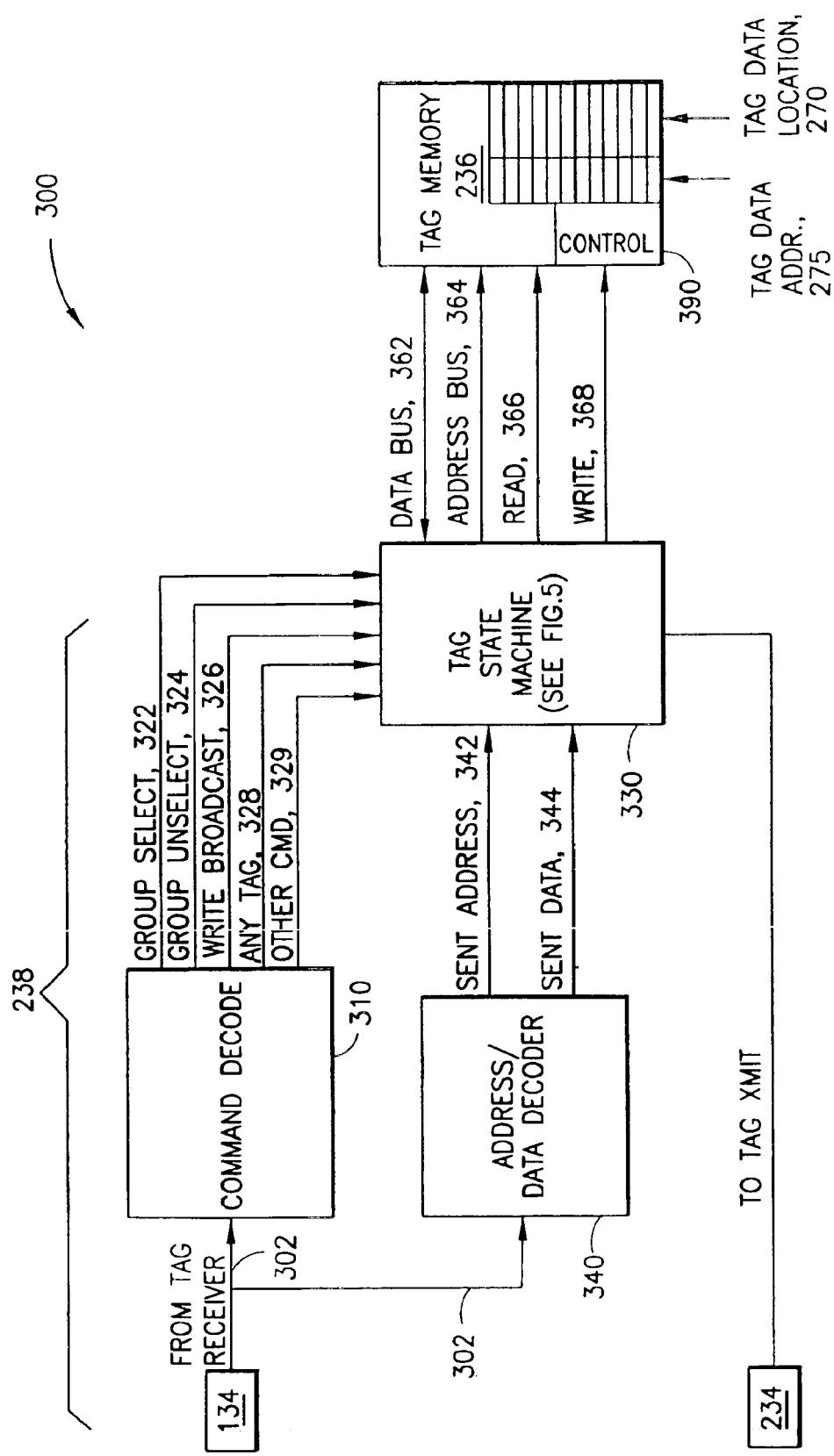
FIG. 3 is a block diagram showing one preferred embodiment of tag logic and tag memory in a preferred radio frequency tag.

FIG. 3 is a block diagram showing one preferred embodiment of tag logic and tag memory in a preferred radio frequency tag. The block diagram 300 shows the tag logic 238 and the tag memory 236.

The tag logic 238 receives a signal from the tag receiver 134. The signal can include a Group Select command 322 (optional), a Group Unselect command 324 (optional), a Write Broadcast command 326 (optional), an Any Tag command 328 (optional), and any other optional command 329. The Command Decode block 310, decodes the received signal 302 from the tag receiver 134 to determine the command type.

Group Select 322 and Group Unselect 324 commands are used to select (unselect) sub groups of tags in the field of tags. The selected (unselected) tags are those that respond (do not respond) to further commands sent by the base station 105. Group Select 322 and Group Unselect commands are described in U.S. patent application Ser. No. 08/303,965 entitled System and Method for Radio Frequency Tag Group Select to Cesar et al. filed on Sept. 9, 1995 which is herein incorporated by reference in its entirety.

The Write Broadcast 326 command is decoded in block 310 by identifying that the received signal 302 has a Write Broadcast field 260 with a Write Broadcast command code. When the Write Broadcast command 326 is decoded, a tag state machine 330 processes the sent data 145 and sent address 245 using an address/Data Decoder 340. The tag state machine 330 (and alternative embodiments) are described in the FIG. 5 (FIG. 4) description below.

Note that in some preferred embodiments, the tag will only have a Write Broadcast 326 function. In these embodiments, the tag will write sent data 145 in a sent address 245 of any write command to the tag memory 236. Upon receiving a write command, this embodiment, implemented without a command decode block 310 and the tag state machine 330, will load the sent data 145 into the data location 270 with the data address 275 that matches the sent address (342, 245).

The Address/Data Decode 340 provides the Tag State Machine 330 with the sent data 145 and sent address 245 that is encoded on the received signal 302 over the respective Sent Data Bus 344 and Sent Address Bus 342. The Tag State Machine 330 processes this information by sending a Write command over a Write Bus 368 to a Control Section 390 of the tag memory 236. The Control Section 390 causes the sent data 145 to be written to the tag data location 270 that corresponds to the tag address 275 that matches the sent address 245. The sent data 145 and sent address 245 are provided to the Tag Memory 236 over a respective Data Bus 362 and Address Bus 364 connecting the Tag State Machine 330 and the Tag Memory 236. If information is to be read from the Tag Memory 236, the information (Tag Data Location 270) is accessed using the corresponding Tag Data Address 275 and the Control Section 390 to pass the information in Tag Data Location 270 over a Read Bus 366 to the Tag State Machine 330. The Tag State Machine 330 then passes the read information to the Tag Transmitter 234 to be sent to the base station 105 through the tag antenna 132.

The Any Tag command 328 is an optional command. Any tag 230 that receives the Any Tag command 328 sends a response to the base station. This command 328 is useful in determining whether there is one or more tags in the base station field and/or one or more members of a selected (or unselected) group of tags. In alternative preferred embodiments, the tag response is sent out by any tag selected by a Group Select command 322 and the Any Tag command 328 may be omitted.

Figure 4:
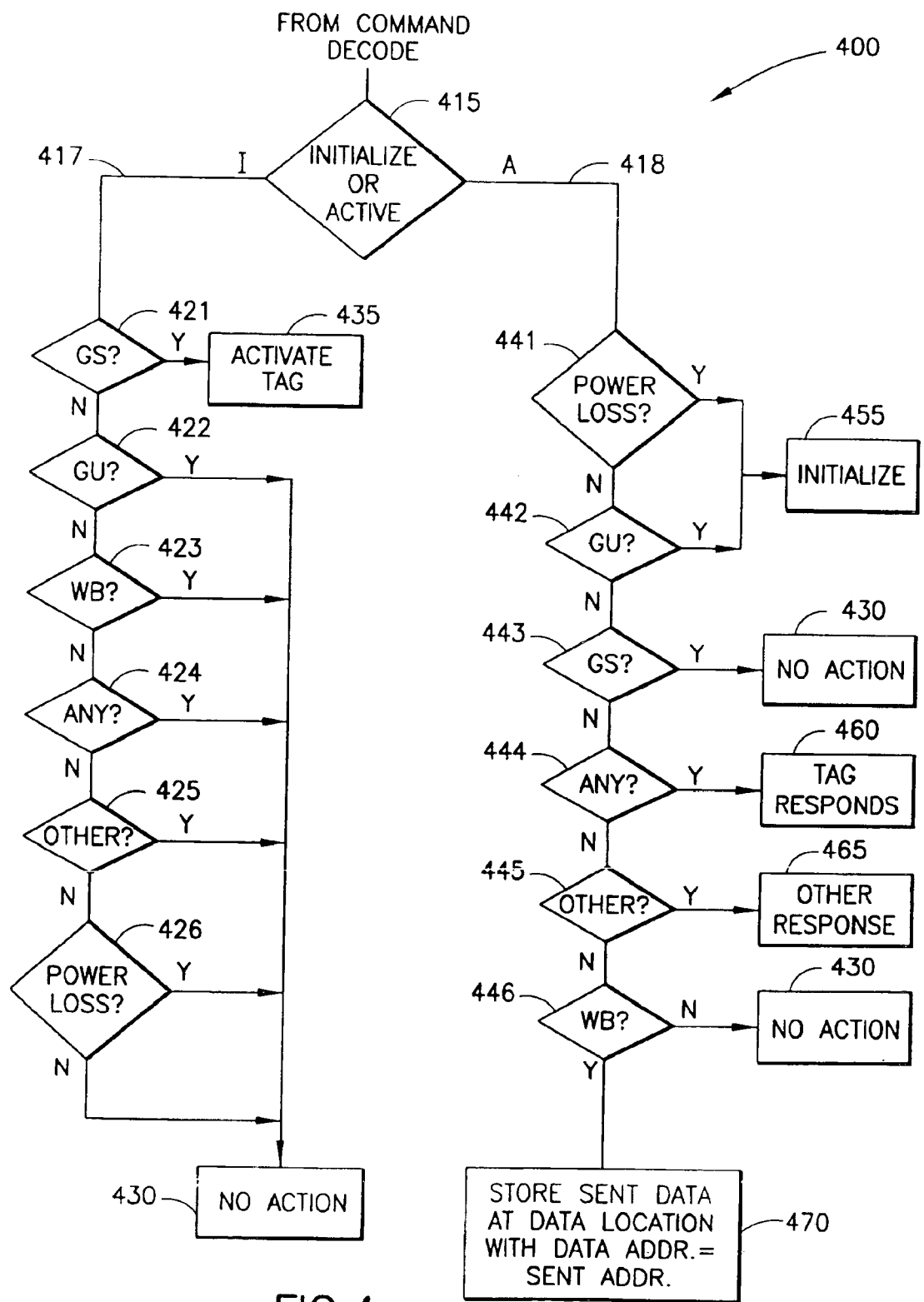
FIG. 4 is a flow chart showing the steps of a preferred method performed by the tag logic.

FIG. 4 is a flow chart showing the steps of one preferred process 400 performed by the Tag State Machine 330. In this embodiment, the Tag Logic 238 could be a micro computer executing a program performing the process 400. Alternatively, the Tag Logic 238 could be a logic circuit performing the steps of process 400.

The process 400 receives a command from the command decode block 310. The process begins by determining 415 whether the tag is in the initialized or active state. The tag 230 reacts differently to certain commands depending on the state of the tag.

If the tag 230 is in the initialized state 417, the process 400 checks what type of command was received. If a Group Select command 322 is received 421, the tag state is changed to active 435. If a Group Unselect 422, Write Broadcast 423, Any Tag 424, or Other (like Read) 425 command is received, no action 430 is taken. If the tag has a power supply that is lost and/or the base station has lost power and sends a power loss signal 426, no action 430 is taken in the initialized state 417 of the tag. Note that the commands 421–426 can be processed in any order.

If the tag 230 is in the active state 418, the process 400 again checks what type of command was received. If a Power Loss 441 or Group Unselect 442 command is received, the tag state is changed to initialized 455. If a Group Select command 322 is received 443, the no action 430 is taken. If an Any Tag 328 command is received 444, the tag sends a response to the base station 460. If an Other (like Read) 329 command is received 445, the tag performs the appropriate response. If the Write Broadcast command 326 is received 446, the sent data 344 is stored at the data location 270 with the data address 275 equal to the sent address 342 (step 470.) No action 430 is taken in step 446 if there is no Write Broadcast. Note that the commands 441–446 can be processed in any order.

In an alternative preferred embodiment, e.g. using the tag 130 shown in system 100, the tag 130 can have a process 400 comprising only steps 445, 465, 446 and 470. In this case, the Other command 445 would be a Read command and the Other Response 465 would permit the base station 105 to read the data in the tag memory. The Write Broadcast command 446 would direct the tag to store the sent data 145 in the tag 130 memory 136. Other embodiments are made by using various combinations of Group Select 322, Group Unselect 324, Write Broadcast 326, Any Tag 328, and Other 329 commands.

Figure 5:
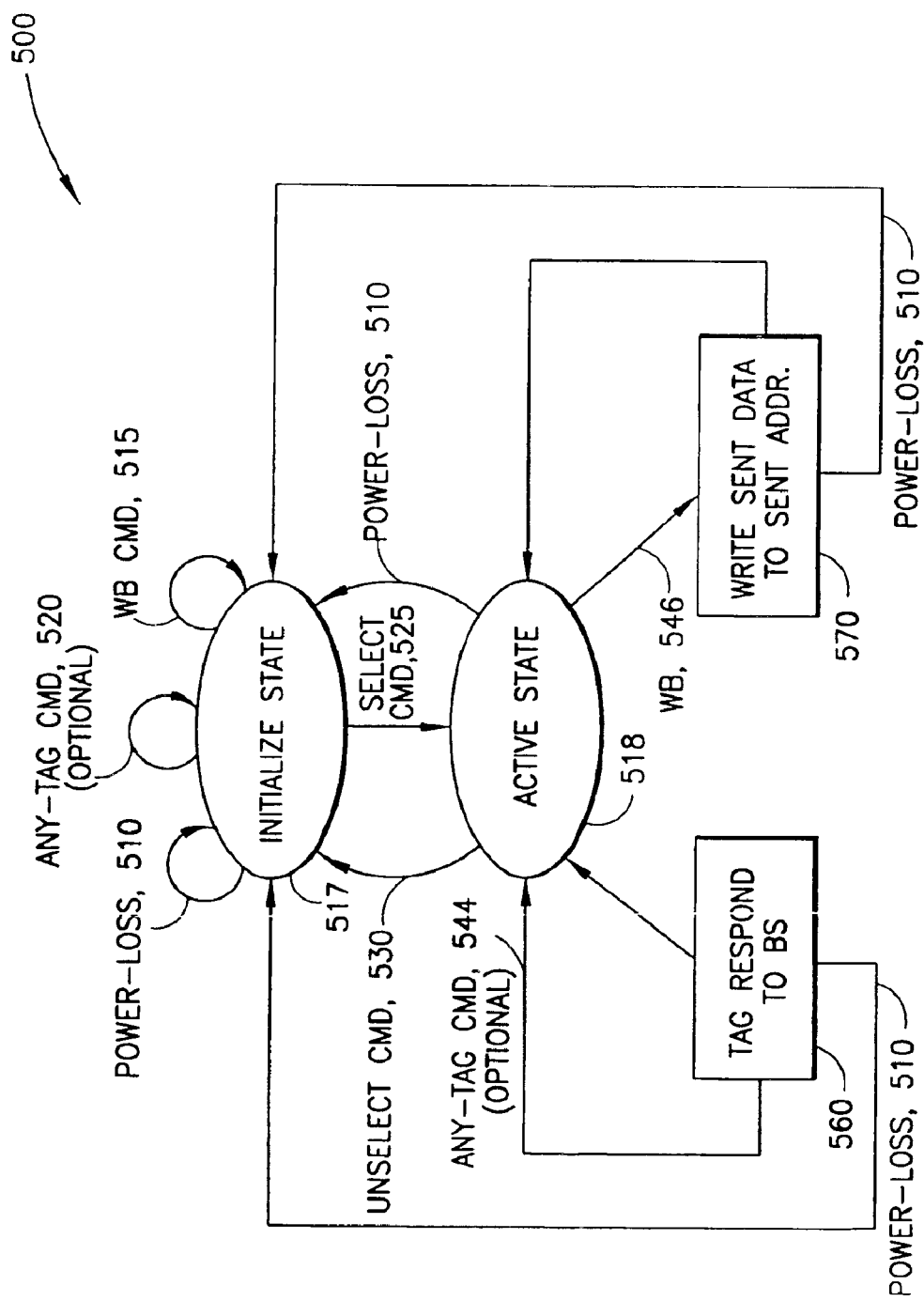
FIG. 5 is a state diagram showing the states of one preferred RF tag.

FIG. 5 is a state diagram of one preferred embodiment a state machine 500 used as block 330. The state machine 500 in the RF tag 230 uses various states to execute commands from the command decode 310.

The state machine 500 has two states: the initialized state 517 and the active state 518. A power loss (either on board the tag for tags with power or a power loss signal sent by the base station) causes the tag 230 to transfer 510 to the initialize 517 state. This transfer 510 happens if there is a power loss 510 in either the initialized state 517, the active state 518, and/or during any action performed by the tag 230. If the tag 230 is in the initialized state 517 and receives a Write Broadcast or Any Tag command, the tag 230 remains (515 and 520 respectively) in the initialized state 517. If a tag 230 in the initialized state 517 is selected by a Group Select command 322, the selected tag is transferred 525 to its active state 518. If a tag 230 in the active state 518 is unselected by a Group Unselect command 324, the unselected tag transfers 530 to its initialized state 517.

If the tag 230 is in the active state 518 and receives a Write Broadcast 326 command, the tag writes 570 the sent data 344 to the tag data location 270 with the tag data address 275 equal to the sent address 342 (see 546) and returns to the active state 518. However, if the tag is busy when the Write Broadcast 326 command is received, the sent data 344 is not written 570 and the tag returns to the active state 518. For example, this situation might occur when the tag is responding to an Any Tag command 328 when the Write Broadcast command 326 is received. In an alternative preferred embodiment, the base station sends a command and receives a response from one or more tags before sending a second command. This prevents the tag being busy when the Write Broadcast 326 command is received.

If the tag 230 is in the active state 518 and receives an Any Tag command 328 (or Other command 329—not shown), the tag responds 560 to the base station and returns to the active state 518. However, if the tag is busy when the Any Tag command 328 (Other command 329) is 328 received, the tag does not respond and the tag returns to the active state 518. For example, this situation might occur when the tag is responding to a Read command when the Any Tag command 328 is received. Again, in an alternative preferred embodiment, the base station waits for a tag response before sending out a second command.

Figure 6A:
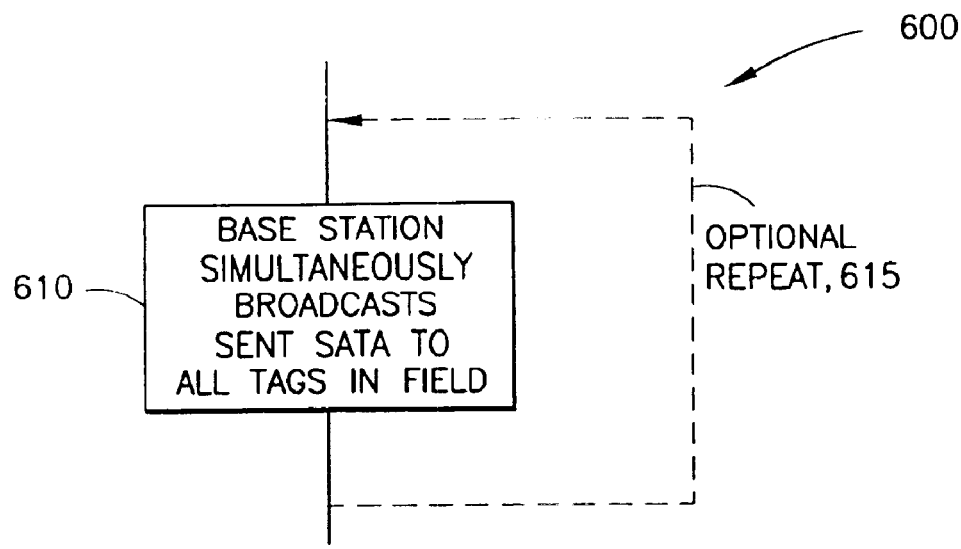
FIG. 6A shows the steps performed by the base station in FIG. 1

FIG. 6A is a flow chart showing the steps performed by the base station in FIG. 1. In this embodiment, the base station 105 broadcasts 610 a signal with sent data 145 simultaneously to all tags 130 in the field 120. No identification of the tags 130 is done. The broadcast 610 is optionally repeated any number of times.

Figure 6B:
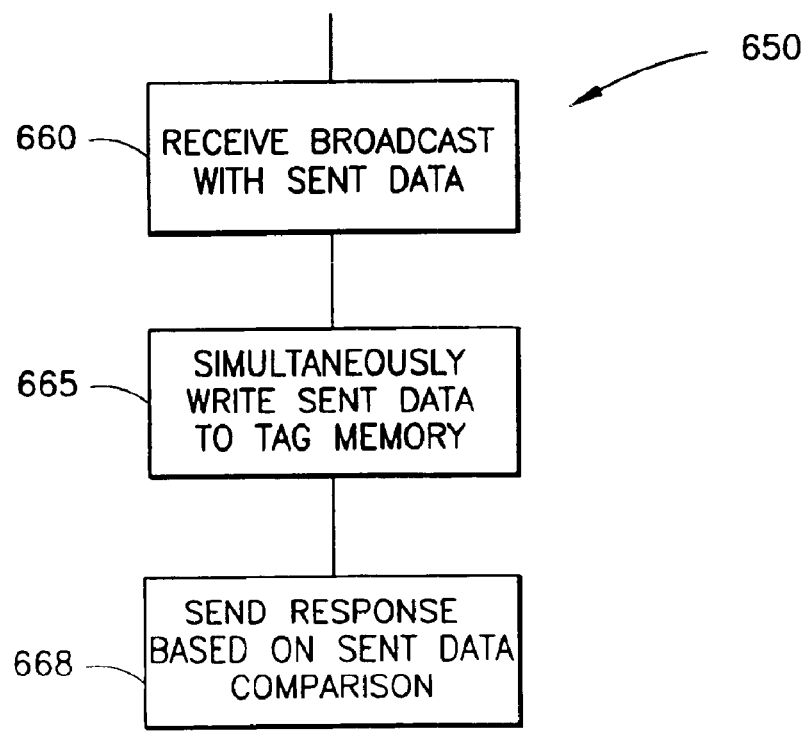
FIG. 6B shows the steps performed by the tags in the base station field of FIGS. 1 and 2.

FIG. 6B shows the steps performed by the tags 130 in the base station field 120 of FIGS. 1 and 2. Upon receiving 660 the sent data 145 that the base station 105 broadcasts, all the tags 130 in the field simultaneously write 665 the sent data 145 to their respective tag memory 136.

Optionally, in step 668, the tag logic 238 uses a compare circuit 239 (see FIG. 2) to compare if the sent data 145 is different than the data stored (old data) in the tag data location 270 associated with the tag data address 275 in the tag memory 236 that corresponds to the sent address 245. If the sent data 145 is different than the old data, the tag logic 238 writes 665 the sent data 145 in the tag data location 270 associated with the tag data address 275 in the tag memory 236 corresponding to the sent address 245 and the tag sends a response through the tag antenna to the base station 105. If the sent data 145 is the same as the old data, the tag sends no response. In this way, the base station 105 will receive a response if sent data 145 is written to at least one tag in the field 120. Optionally, if the sent data 145 is the same as the old data, the writing 665 can be omitted.

Optionally, the tag 130 can send to the base station 105 information relating to the results of the execution of a command or commands, e.g. 260, and/or provide information about error conditions resulting from the execution of a command or commands sent from the base station 105.

Figure 7:
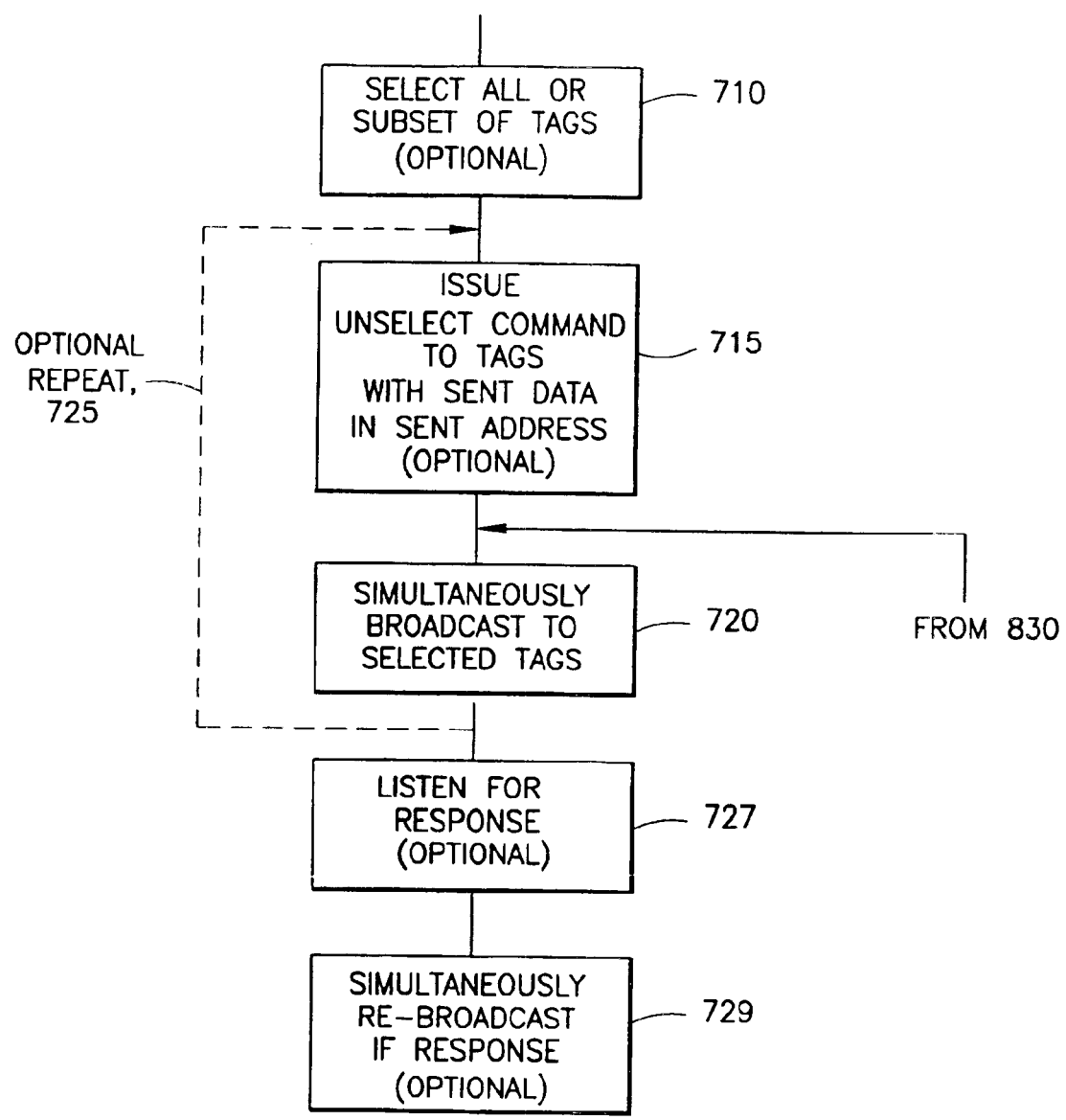
FIG. 7 shows the steps of alternative processes performed by the base station in FIG. 2.

FIG. 7 shows the steps performed by alternative preferred processes 700 in the base station of system 200 in FIG. 2.

In step 710, all the tags 230 in the field 120 are selected.

Alternatively, subgroups of tags in the field 120 are selected. This is done by using the Group Select and/or Group Unselect commands.

Step 710 is optional.

In optional step 715, a Group Unselect command is issued by the base station to unselect (transfer to the initialize state) tags that have tag data values equal to the sent data 145 in the tag memory location 270 that corresponds (e.g. is the same as) the sent address 245. In one preferred embodiment this is done to prevent tags with correctly written data from writing again so tag power consumption and the risk of writing erroneous data is reduced.

Once the tags are selected (if this is done), the base station 105 broadcasts 720 a signal with sent data 145, a sent address 245, and optionally the Write Broadcast command 260, simultaneously to all tags 130 in the field 120. No identification of the tags 130 is done.

Upon receiving 720 the sent data 145 and the sent address 245 that the base station 105 broadcasts, all the tags 130 in the field simultaneously write 665 the sent data 145 to their respective tag location 270 that has the data address 275 equal to the sent address 245.

Steps 710 and 720 (or step 720 alone) are optionally repeated 725 any number of times.

In addition, steps 727 and 729 may be optionally performed. In step 727, the base station 105 listens (monitors) for a response 668 from one or more tags in the field 120 to indicate that sent data was not written to at least one tag. If a response is received, the base station 105 re-broadcasts (retransmits) 729 the sent data 145 and sent address 245 again.

The response is generated by the tag 130 when the tag logic 238 compares the sent data 344 to the data stored in the tag data location 270 in the tag memory 236 to confirm that the write was correctly performed. The tag responds if the comparison is not equal.

Repeating (615, 725) the steps is useful in applications where tagged objects are to be written to continually and/or randomly pass through the field 120 of the base station. For example, tagged articles on a conveyer belt are "time stamped" with the date of manufacture or given an article identification number as they pass through the base station field 120. The base station repeats (615, 725) the write broadcast signal at a high enough frequency to insure that every article passing through the field 120 receives at least one write broadcast signal. In alternative embodiments, a base station 105 continually sends out write broadcast signals (repeats 615, 725) so that any tag that happens to be within the field 120 has certain information written to it. For example, a base station 105 on a loading dock repeats (615, 725) a write broadcast signal that has location information (time) as sent data 145. In this example, any tag that may be located on the dock will have the location recorded in the tag memory (136, 236). This information can be read later to determine point of origin, routing, etc. of the object to which the tag is attached.

Figure 8:
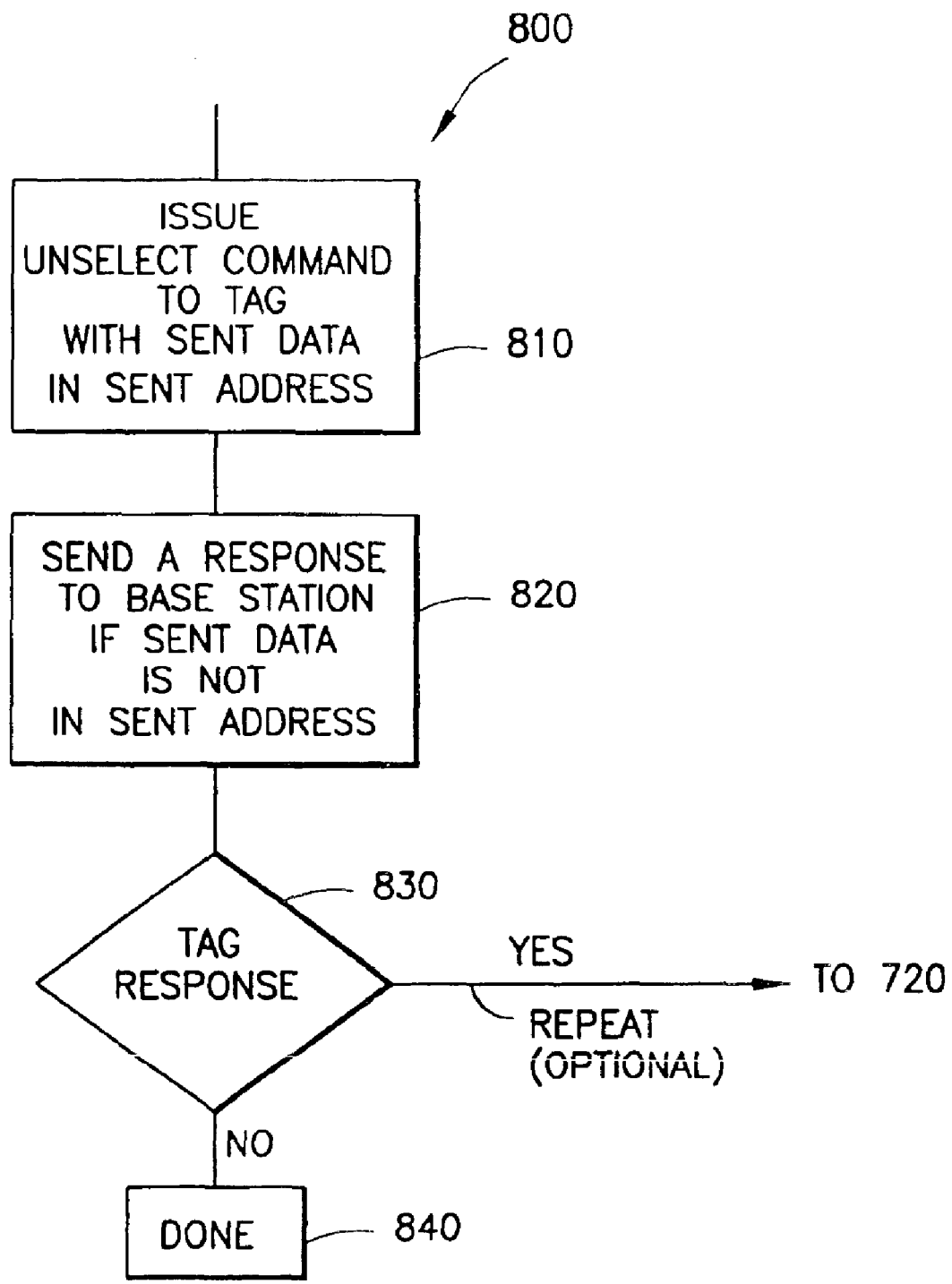
FIG. 8 is a flow chart of one preferred embodiment of identifying tags in the field that have failed to correctly process a write broadcast signal sent from the base station.

FIG. 8 is a flow chart of one preferred process 800 for identifying tags in the field that have failed to correctly process a write broadcast signal sent from the base station. This is a way to verify the success of a given Write Broadcast command. If the Write Broadcast command is unsuccessful for one or more tags, e.g. one or more tags failed to detect that the Write Broadcast command was sent, another Write Broadcast command can be sent to write to the tags that failed to be written to. Process 800 is optional and can be executed with process 700.

Process 800 begins by issuing an Unselect command 810. The Unselect command unselects tags 230 in the field 120 that have the sent data 145 in their tag data location 270 that has a tag data address 275 equal to the sent address 245. These tags 230 are now initialized (415, 517) and will not respond in step 830.

The system determines if there was a failure of one or more tags in the field to write the sent data 145 to the tag data location 270 with the tag data address 275 corresponding to the sent address 245. In one embodiment, this occurs in the execution of step 810 where the tag is designed to automatically respond to an Unselect Command if the tag is not Unselected, i.e., the tag does not have the sent data 145 in the proper tag data location 270. In an alternative embodiment, tags that have sent data 145 in their tag data location 270 that corresponds to (e.g. equals) the sent address 245 are unselected by an Unselect command and then an Any Tag (or similar) command is issued by the base station to cause tags without sent data 145 in the proper tag data location 270 to respond.

In addition, to write to all tags (or a subset of the tags) in the field 120, steps 810 and 820 can be performed by the base station 105 issuing a Select command that selects tags 230 with data not equal to the sent data 145 in their data location 270 with a data address 275 corresponding to (e.g. equal to) the sent address 245. This command places or again places the selected tags 230 in the active (415, 518) state. In some preferred embodiments, this automatically causes the tag 230 to send a response 830.

In any case, the tags with data not equal to the sent data 145 in their data location 270 with a data address 275 equal to the sent address 245 respond in step 830. If the base station 105 detects a response, the Write Broadcast signal is (optionally) repeated, e.g. see process 700. If there is no received response from the tags in the field 120, either there are no tags in the field or all have been successfully written to. Therefore, the process ends 840.

Using processes 600, 650, or 700 and optionally 800, enables these systems (100, 200) to write to very large number of tags (130, 230) in a field 120 with very few (or even one) Write Broadcast signal. Therefore, large number of tags (130, 230) can be written to with the same information very quickly.

Figure 9:
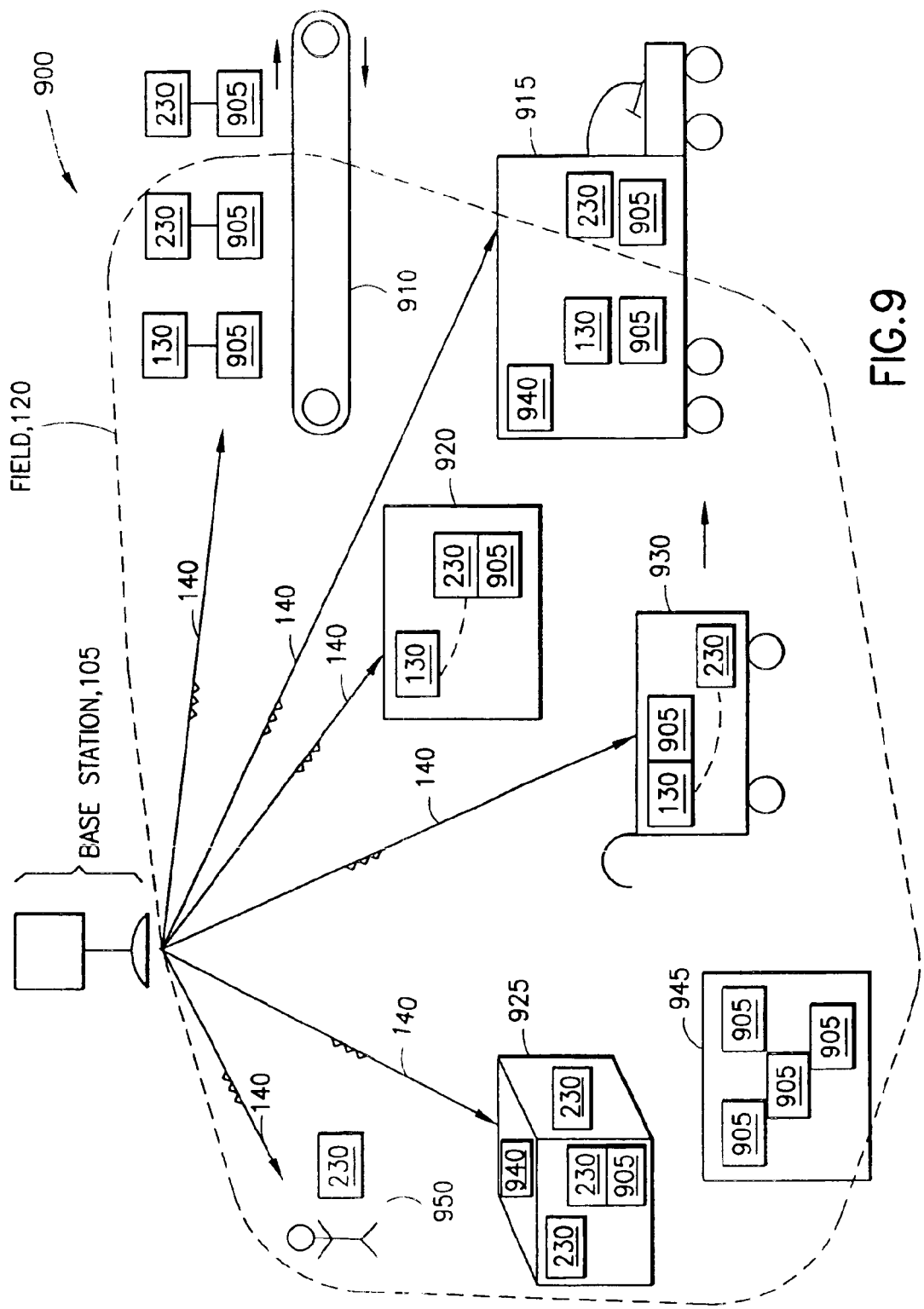
FIG. 9 is a block diagram of the present system used in various applications.

FIG. 9 is a block diagram of the present system used in various non limiting applications. Applications of the invention include writing information to tags that are moving through the base station 105 field 120 and/or writing information to large numbers of tags that are within the field 120 during a given time period. For example, objects 905 in the field 120 are tagged with tags (typically 130, 230). The tagged objects 905 pass through the field 120 by being transported on various locomotive apparatus, e.g., conveyer belts/assembly lines 910, cars/trucks 915, carts 930. Tagged people or animals 950 can also move through the field 120. Large numbers of tagged objects 905 can exist in containers/crates (920, 925) and/or in temporary storage locations 945 like warehouses or cargo bays of ships/planes. Tags (130, 230) in metallic crates (920, 925), containers (e.g. trucks or railroad cars 915), or objects can be written to using Frequency Selective Windows 940 as described in U.S. patent application Ser. No. 08/521,902 filed on Aug. 31, 1995 to Afzali-Ardakani et al. which is herein incorporated by reference in its entirety.

Various types of information, i.e. sent data 145, can be written to tag data locations 270. The base station can establish that certain data addresses 275 of the tag 230 contain a certain type of information in their associated data location 270, i.e., tag data 270 (sent data 145.) For example, data address 275 number 5 (6 and 7, respectively) can correspond to the time (date and location, respectively.) The base station 105 can write information to each of these respective data locations 270 by issuing a Write Broadcast command with the sent address 245 equal to the data address 275 of the predesignated data location 270 for each sent data 145 to be written to the tag 230. Using multiple Write Broadcast commands, the base station 105 can write different information (sent data 145) to specific data locations 270 in the tag memories 236. Examples of sent data 145 written to the data locations 270 include: object 905 status and identity, pricing, payment object 905 history, location, time, date, tracking information, handling instructions, and object 905 use and compatibility.

For example, for manufactured items passing through the field 120 on an assembly line 910, the base station sent data 145 can be identification information like: UPC, serial, batch, and/or manufacturer identification numbers that identify the objects 905. Sent data 145 can be descriptive information like: dye lot of fabric, cost, price, inspection number, and/or hazardous material codes. Sent data 145 can be use information like: expiration dates, associated assembly and subassembly information, recycling information, cleaning instructions, and/or compatibility with other parts/materials. Sent data 145 can be tracking and location information like point of origin, destination(s) (e.g. of mail or packages), time and date, responsible contact, and/or person handling. Sent data 145 can be status information indicating that the object 905 is paid for, tested, inventoried, number of uses, number of cleanings, etc. Sent data can be handling instructions like: when to clean, ways to dispose, where to ship for maintenance, etc.

Figure 10:
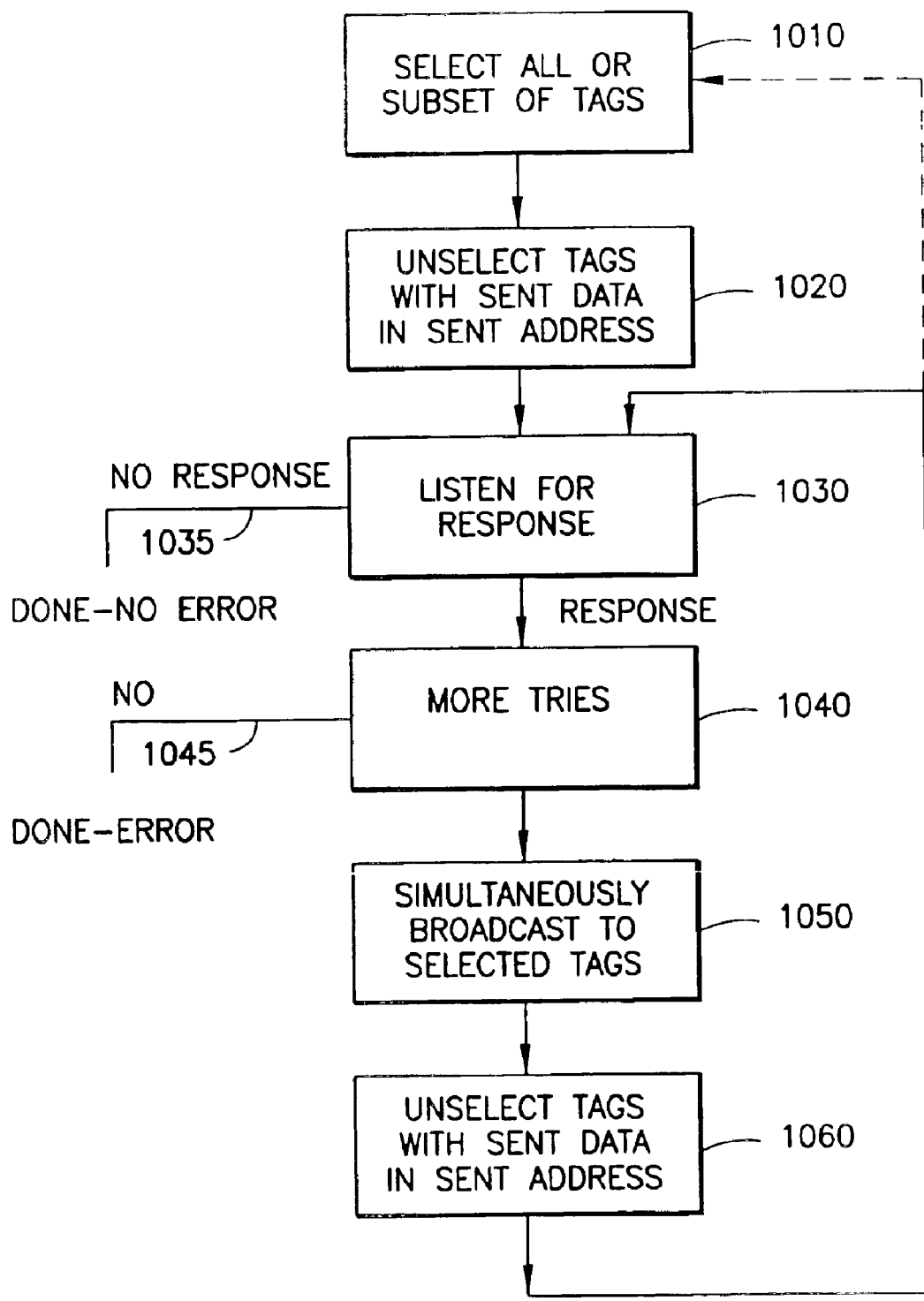
FIG. 10 is a flow chart of an alternative preferred embodiment of selecting and unselecting tags in the field along with sending write broadcast signals to the field.

FIG. 10 shows the steps performed by an alternate preferred process 1000 in the base station of system 200 in FIG. 2.

In step 1010, a group select command is issued by the base station to select a subset of the tags 230 in the field 120. Selected tags are moved from the initialize state 517 to the active state 518. Only active tags respond to subsequent commands.

In step 1010, the subset of tags can optionally be all the tags, if the base station issues the appropriate group select command. In step 1010, the subset of tags can optionally be increased or decreased by issuing a sequence of group select and group unselect commands.

In step 1020, a group unselect command is issued by the base station to transfer to the initialize state those active tags that have tag data values equal to the sent data 145 in the tag memory location 270 that corresponds to the sent address 245.

Step 1020 is optional. By moving tags with already correct data in the tag data memory back to the initialize state 517, the subsequent write broadcast command 250 will be ignored for those tags. Step 1020 thus has the effect of avoiding unnecessary tag memory write operations. The utility of this step includes, but is not limited to, the following:
1) For tags where each write command consumes a limited power resource, step 1020 avoids unnecessary tag power consumption.
2) For tags which can tolerate only a limited number of memory write operations, step 1020 avoids unnecessary tag memory wear.
3) For tags where write operations have the possibility of error, step 1020 avoids the possibility of overwriting good data with bad data.

In step 1020, tags with tag data values not equal to the send data 145 in the tag memory location 270 corresponding to the sent address 245 respond to the base station 105.

In step 1030, the base station receiver 206 distinguishes between the case of no tags responding and the case of one or more tags responding.

If no tags respond, all active tags had tag data values equal to sent data and were moved to the initialize state 517 in step 1020. In step 1035, processing is therefore complete with no errors.

If one or more tags respond, step 1040 is performed. The write broadcast can be performed one or more times, determined by a tries parameter tracked by the base station computer 108.

If all tries have been consumed, step 1045 reports that processing is complete with errors. The active tags are those with errors. They can be subjected to further processing to determine and correct the error.

If not all tries have been performed, step 1050 indicates that the base station 105 broadcasts a signal 250 with sent data 145, a sent address 245, and the write broadcast command 260.

Upon receiving the write broadcast signal 250, all the active tags 130 simultaneously write the sent data 145 to the sent address 245 in the tag data memory 236.

Step 1060 is identical to step 1020. A group unselect causes correctly written tags to move back to the initialize state, and tags not correctly written to remain in the active state and respond.

From step 1060, the process moves back to step 1030, repeating the process until either all tags are correctly written or until all tries are consumed.

Optionally, from step 1060, the process can move back to step 1010. That is, before the unselect of step 1020, the entire subset can again be selected. Going to either step has advantages in certain applications. For example:

1) In an application where speed is important, going to step 1020 saves the time required to select the subgroup for each try.
2) In an application where tags 230 are continuously entering the field 120, going to step 1010 will select new tags 230 as they enter the field 120 and include them in the write broadcast process 1050.

Given this disclosure, equivalent embodiments of this invention will be apparent to those skilled in the art. These embodiments are also with in the contemplation of the inventors.

We claim:

1. A radio frequency tag comprising:
   a tag antenna for receiving a radio frequency signal from a base station, the radio frequency signal having sent data;
   a tag memory having a tag data location with old data;
   a tag logic having an active state and an initialize state, a Select Command placing the tag in the active state if the tag meets a select condition and an Unselect Command placing the tag in the initialize state if the tag meets an unselect condition;
   a tag receiver for receiving the radio frequency signal from the tag antenna, the tag writing the sent data to the tag data location if the tag is in the active state and the tag not writing the sent data to the tag data location if the tag is in the initialize state.

2. A tag, as in claim 1, where writing the sent data occurs in the tag without the tag sending a response containing a tag identifier.

3. A tag, as in claim 1, where the tag further comprises a decoder that decodes an Any Tag command that causes the tag to communicate a response when the tag is in the active state and that causes the tag not to communicate a response when the tag is in the initialize state.

4. A radio frequency tag comprising:
   a tag antenna for receiving a radio frequency signal from a base station, the radio frequency signal having zero or more sent data and zero or more of the sent addresses corresponding to the sent data;
   a tag receiver for decoding each of the sent data and the sent addresses from the radio frequency signal;
   a tag memory having one or more tag data locations, each tag data location having a respective tag data address; and
   a tag receiver for receiving the radio frequency signal from the tag antenna; and
   a tag logic having an active state and an initialize state, a Select Command placing the tag in the active state if the tag meets a select condition and an Unselect Command placing the tag in the initialize state if the tag meets an unselect condition, the tag logic writing each of the sent data in the tag data location with the tag data address corresponding to the respective sent address if the tag is in the active state and the tag not writing any of the sent data if the tag is in the initialize state.

5. A base station for communicating with zero or more tags in a field of the base station, each of the tags having a tag memory, the base station comprising:
   a signal generator that develops a signal containing a sent data;
   a base station transmitter that encodes the signal on the carrier to create an encoded signal; and
   a base station antenna that transmits the encoded signal to two or more tags in the field causing the tags to simultaneously write the sent data into the tag memory and listens for a response from one or more tags, the response causing the base station transmitter to retransmit the encoded signal.

6. A base station for communicating with zero or more radio frequency tags in a field of the base station, each of the tags having a tag memory, the tag memory having one or more tag data locations and each of the tag data locations having a tag data address, the base station comprising:
   a computer that develops a select command and a write broadcast signal, the write broadcast signal containing zero or more write broadcast commands, zero or more sent data and zero or more sent addresses;
   a base station transmitter that encodes the select command on a radio frequency carrier to create a select signal and encodes the write broadcast signal on the radio frequency carrier to create a write signal; and
   a base station antenna that transmits the select signal to all the tags in the field to select a subgroup of the tags, and subsequently transmitting the write signal to simultaneously write each of the send data to the tag data locations having tag data addresses corresponding to the sent addresses.

7. A radio frequency tagging system comprising:
   zero or more radio frequency tags, each tag having a tag logic, a tag antenna, and a tag data location; and
   a base station having a signal generator, a transmitter, and a base antenna, the signal generator sending a carrier signal through the transmitter and base antenna to create a field, the transmitter encoding sent data generated by the signal generator onto the carrier signal to produce an encoded carrier signal, zero or more tags in the field receiving the carrier signal through their respective tag antennas and the tag logic of each tag in the field decoding the sent data and causing the sent data to be simultaneously written to the respective tag data location, the tag logic causing the tag to send a response if the sent data is different than an old data in the tag data location and not send the response if the sent data is the same as the old data, the base station resending the encoded carrier signal if a response is received from one or more of the tags.

8. A radio frequency tagging system comprising:
   zero or more radio frequency tags, each tag having a tag logic and a tag antenna and each tag further having one or more tag data locations associated with a tag data address;
   a base station having a computer, a transmitter, and a base antenna; and
   a process executed by the computer that causes a radio frequency write broadcast signal to be sent through the transmitter and base antenna to create a field, the write broadcast signal having two or more pairs of sent data and a sent address corresponding to each of the sent data, one or more tags in the field receiving the write broadcast signal through the tag antenna and the tag logic of each tag in the field causing the sent data to be simultaneously written to each of the tag data locations that has a tag data address matching the respective sent address.

9. A system, as in claim 8, where the tag logic causes the tag to send a response if the sent data is different than an old data in the tag data location and not send the response if the sent data is the same as the old data, the base station resending the encoded carrier signal if a response is received from one or more of the tags.

10. A radio frequency tagging system, as in claim 8, where the base station sends a group unselect command and one or more of the tags that has an old data in the tag data location that does not equal the sent data sends a response to the group unselect command to the base station.

11. A system, as in claim 8, where the sent data includes any one of the following types of information for an: object identification, object description, object use, object tracking, object location, object status, and object handling.

12. A method performed by a base station comprising the steps of:
   a. selecting a sub group of zero or more tags in a field of tags by sending a select command, only the tags in the sub group enabled to write a sent data to a respective tag memories of the tag;
   b. sending a radio frequency signal, the signal having sent data and causing zero or more of the tags in the field to simultaneously write the sent data to a tag memory in the tags in the subgroup.

13. A method performed by a base station comprising the steps of:
   a. sending a radio frequency signal to a field of zero or more radio frequency tags, the signal having one or more pairs of sent data and sent addresses, each sent address associated with a sent data, and the signal causing zero or more of the tags in the field to write each of the sent data to a tag data location in a tag memory in zero or more tags, the tag data location having a tag data address equal to the sent address associated with the respective sent data; and
   issuing an Unselect command that causes the tags in the field to respond if a value in the each of the tag data locations with tag data addresses corresponding to the sent addresses does not equal the respective sent data.

14. A method, as in claim 13, where the base station re-sends the radio frequency signal if a response is received.

15. A method, as in claim 13, where there is no sent address in one or more of the pairs and the respective tag data locations are pre-assigned.

16. A method, as in claim 13, where there is one sent address that is paired with more than one of the sent data.

17. A radio frequency tag comprising:
   a tag antenna means for receiving a radio frequency signal from a base station, the radio frequency signal having sent data;
   a tag memory means for having a tag data location; and
   a tag receiver means for receiving the radio frequency signal from the tag antenna and writing the sent data to the tag data location; and
   a tag transmitter means for sending a response if the sent data is different than an old data in the tag data location.

18. A radio frequency tag comprising:
   a tag antenna for receiving a radio frequency signal from a base station, the radio frequency signal having sent data, and the tag antenna further for communicating one or more responses to the base station;
   a tag memory having a tag data location with old data;
   a tag logic having an active state and an initialize state, a Select Command placing the tag in the active state if the tag meets a select condition and an Unselect Command placing the tag in the initialize state if the tag meets an unselect condition, where the tag in the active state that receives an Unselect Command and does not meet the unselect condition communicates one of the responses through the tag antenna to the base station;
   a tag receiver for receiving the radio frequency signal from the tag antenna, the tag writing the sent data to the tag data location if the tag is in the active state and the tag not writing the sent data to the tag data location if the tag is in the initialize state.

19. A tag, as in claim 18, where writing the sent data occurs in the tag without the tag sending a response containing a tag identifier.

20. A tag, as in claim 18, where writing the sent data causes the tag to send the response.

21. A tag, as in claim 18, where writing the sent data causes the tag to send the response if the sent data is different from the tag memory data.

22. A base station for communicating with a plurality of radio frequency tags in a field of the base station, each of the tags having a tag memory, the tag memory having one or more tag data locations and each of the tag data locations having a tag data address, the base station comprising:
   a computer that develops an unselect command and a write broadcast signal, the write broadcast signal containing zero or more write broadcast commands, zero or more sent data and zero or more sent addresses;
   a base station transmitter that encodes the unselect command on a radio frequency carrier to create a unselect signal and encodes the write broadcast signal on the radio frequency carrier to create a write signal; and
   a base station antenna that transmits the unselect signal to all the tags in the field to unselect a subgroup of the tags, and subsequently transmitting the write signal to simultaneously write each of the send data to the tag data locations having tag data addresses corresponding to the sent addresses.

23. A method performed by a base station comprising the steps of:
   a. selecting zero or more the tags in a field of tags by issuing one or more select and zero or more unselect commands, the selected tags becoming active and the not selected tags to remain initialized;
   b. issuing an unselect command that causes unselected tags to become initialized if the value in each of the tag data locations with tag data addresses corresponding to the sent address equal to the send data, and to remain active and respond if the value in any of tag data locations does not equal the sent data; and
   c. issuing a write broadcast command if any response is received to step b.

24. A method, as in claim 23, comprising the further step of:
   d. repeating steps b and c until no tags respond.

25. A method, as in claim 23, comprising the further step of:
   d. repeating steps b and c until an allowed number of iterations is reached.

* * * * *